RADIOTELEPHONE RECEIVING SYSTEM EMPLOYING
A PLURALITY OF RECEIVERS
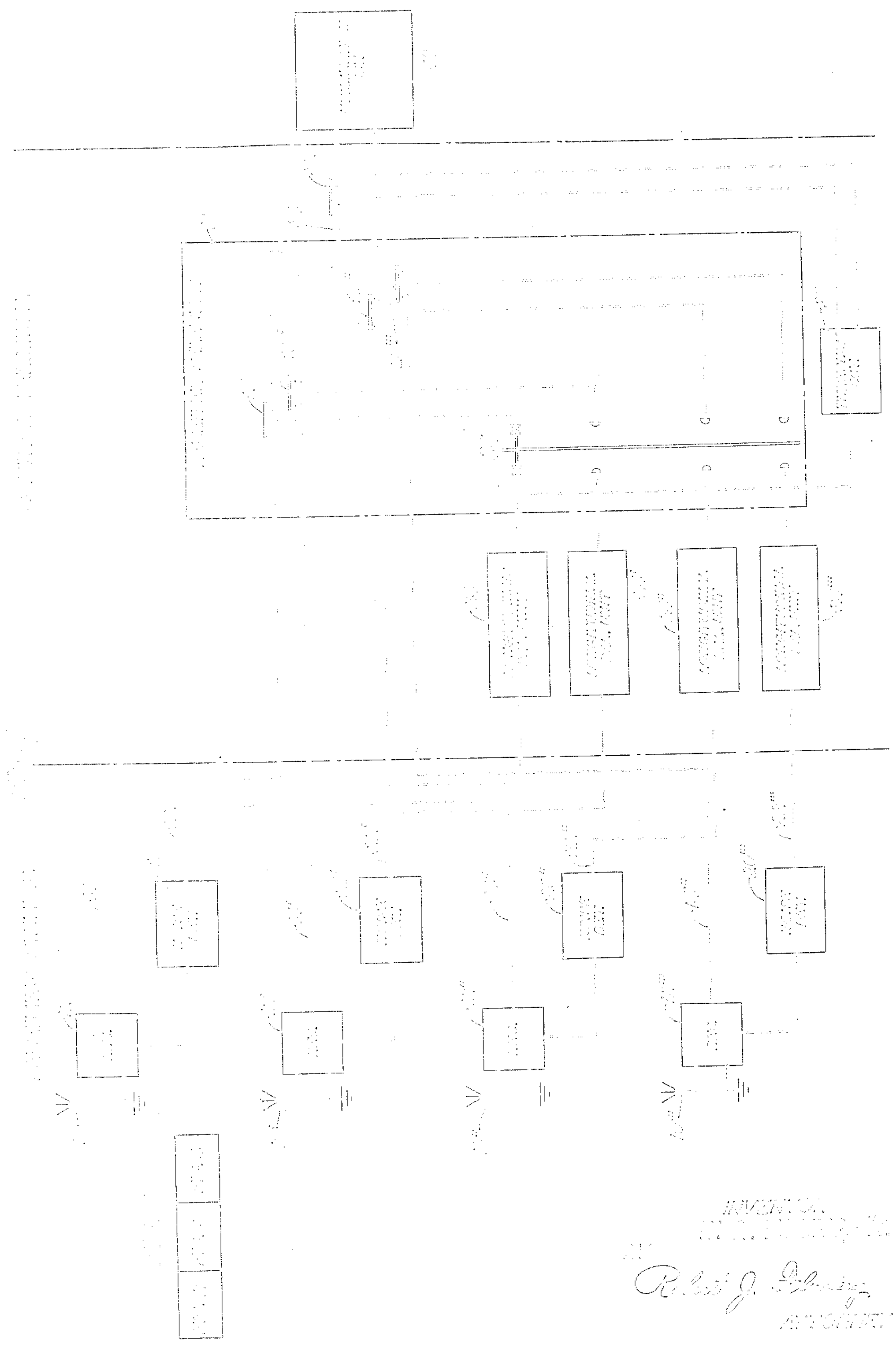
INVENTOR
BY
ATTORNEY

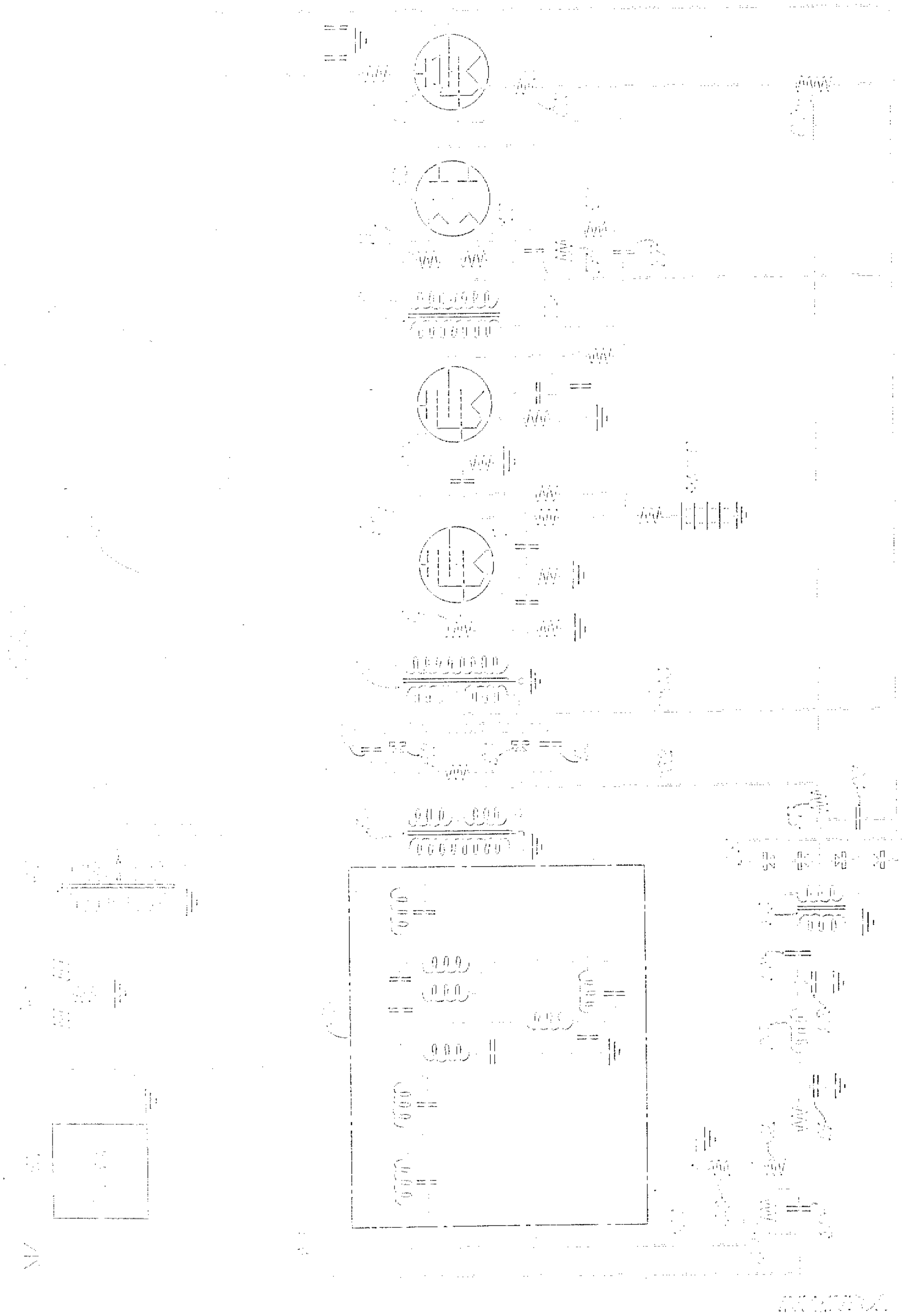
ATTORNEY

RADIOTELEPHONE RECEIVING SYSTEM EMPLOYING
A PLURALITY OF RECEIVERS
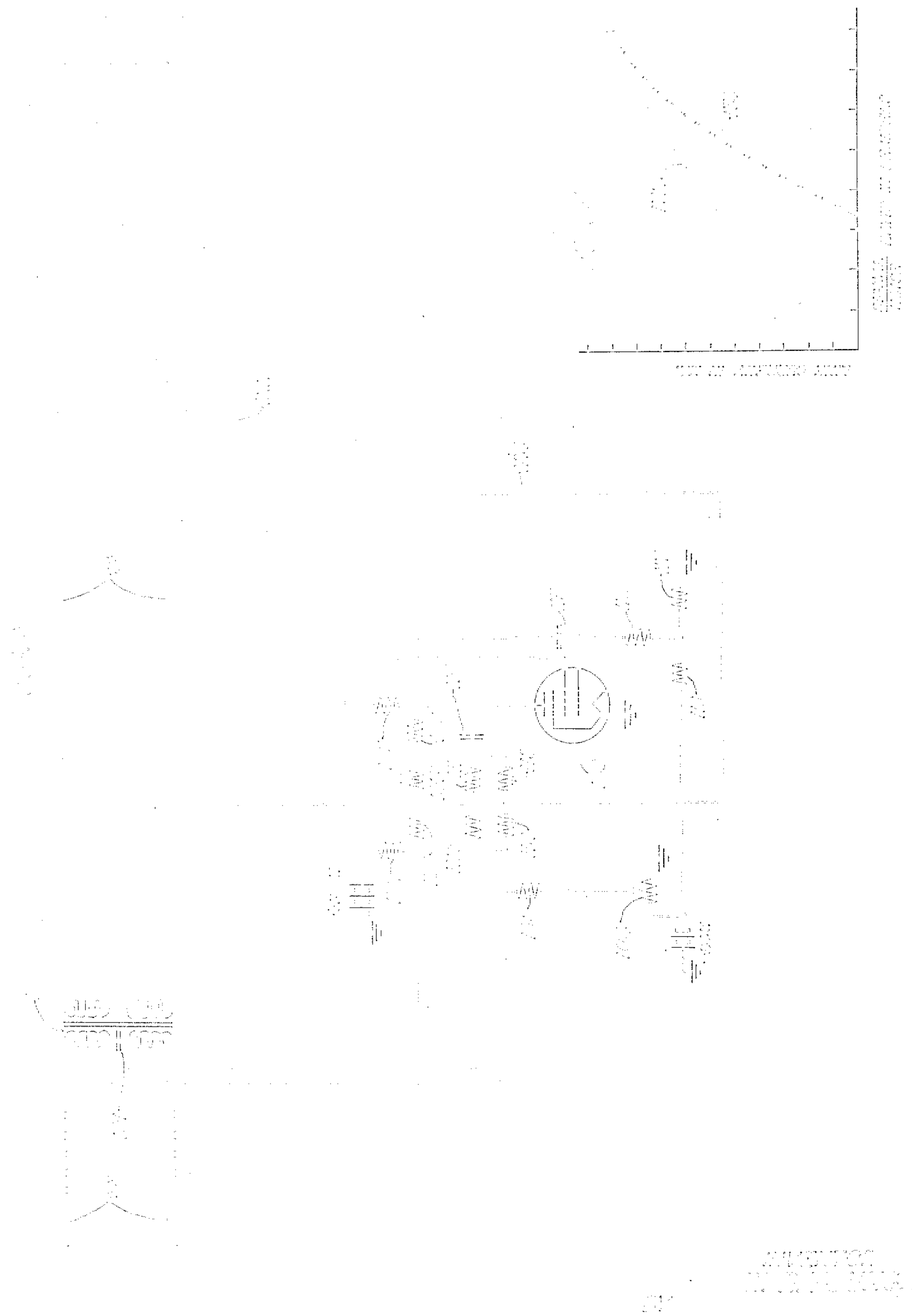
ATTORNEY

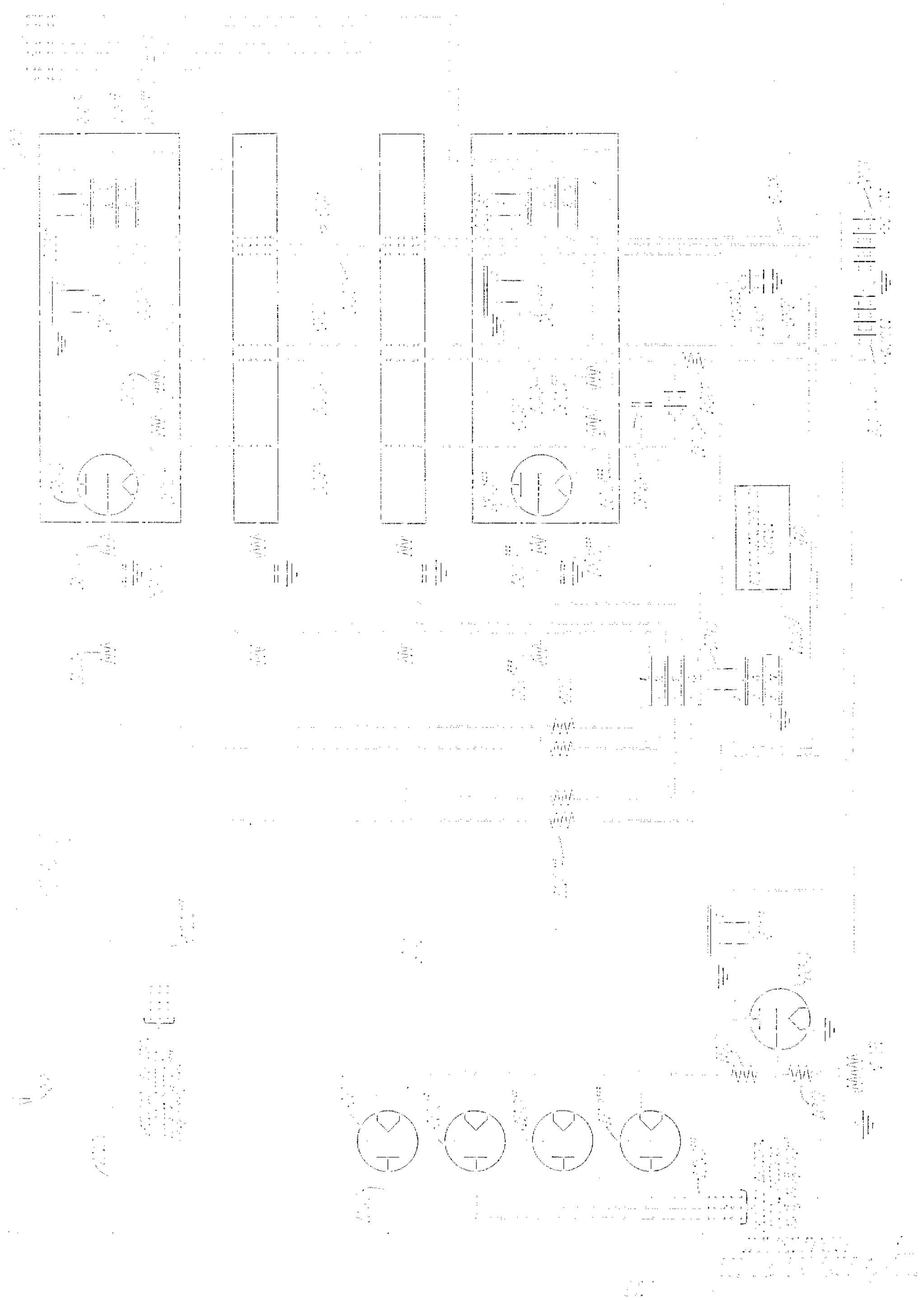

Patented Apr. 28, 1953 2,636,982

UNITED STATES PATENT OFFICE 2,636,982

RADIOTELEPHONE RECEIVING SYSTEM EMPLOYING A PLURALITY OF RECEIVERS

William R. Young, Jr., Summit, N. J., assignor to Bell Telephone Laboratories, Incorporated, New York, N. Y., a corporation of New York Application May 26, 1949, Serial No. 94,448

12 Claims. (Cl. 250—20)

This invention relates to electric signaling systems and more particularly to methods and means for selecting an individual message signal wave from a plurality of such waves.

It is frequently desirable to receive at a number of geographically separated locations the same message signals, and to select from the received signals only that train of received signals which, at any instant, provides the best communication channel. Multiple reception of the same message signals is frequently employed in mobile radio communication systems and in systems in which the signals are transmitted through a variable transmission medium, such that signals received at one location may be subjected to considerably more attenuation than are signals received at a different location.

In such communication systems, it is generally believed to be desirable to select, at any instant, only one such train of received message signals, since if two or more such signal trains are combined, the phase relations of the combined currents may be such as to produce a detrimental or undesirable effect. Furthermore, such signal wave energies are usually accompanied to a greater or lesser degree by noise signal currents. Where such signal currents are directly combined, a more desirable train of signal waves may be impaired by the noise energies that accompany another and less desirable train of signal waves with which it is combined.

It is accordingly one object of this invention to improve the means for selecting from a plurality of received message signals the train of message signals which, at any instant, is judged to be the most desirable.

It is also an object of this invention to provide, in a radio communication system, a means for receiving the message signal waves in which the effect of interfering noise currents is minimized, and in which the reliability of reception is increased.

It is a further object of this invention to provide means for continuously determining the amount of interfering noise currents that accompany the received message signal waves, and to choose between the received message signals in accordance with this determination.

In accordance with the present invention, the same transmitted message signal wave may be received at a number of geographically separated points, and the noise energy that accompanies each train of the received signal waves is continuously determined. At each receiver location there is derived a unidirectional voltage, the amplitude of which is indicative of the level of the interfering noise waves that are received with the message signals at that location. These voltage indications are transmitted to a centrally located selection point. At this selection point a means is provided for continuously comparing the noise-indicating amplitudes of these received unidirectional voltage signals, and for connecting to a utilization circuit the output of the message signal receiver which produces the most desirable unidirectional signal. Means are also provided at this centrally located selection point for cancelling the effect of any induced longitudinal currents that may be added to these derived signals in the transmission paths between the receiver locations and the selection point.

It is a feature of this invention that the continuous determination of the noise energies that accompany the received message signals is made by determining the energy level of the noise currents in the frequency spectrum immediately above and beneath, but not within, the signal frequency spectrum.

It is also a feature of this invention that this noise energy determination is made in such a manner that the different types of noise interference are weighted in much the same manner as their interference effects are noted by the human ear.

It is a further feature of this invention that the relative desirability of each received train of message signal waves is indicated by a unidirectional voltage signal, derived or otherwise generated electrical quantity or factor, for example, the amplitude of which changes with variation in the noise energy that accompanies the signal wave.

Still another feature of the invention is that the effects of longitudinal noise currents that may be induced in the connections over which such merit indicating signals are transmitted, between the points of reception of the noise energies and the centrally located selection station, are nullified.

The manner in which the foregoing objects and features of the invention are realized may be best understood from the following description when considered in conjunction with the drawing in which:

Fig. 1 is a block schematic diagram of a radio receiver selection system in accordance with the invention when arranged to choose between the signal outputs of a plurality of receivers of the same message signal wave;

Fig. 2 is a schematic diagram illustrating primarily one of the noise detecting and evaluating units that are incorporated in a receiver selection system in accordance with the invention;

Fig. 3 is a schematic circuit diagram illustrating primarily one of the longitudinal balancing units that may be used in a selecting system in accordance with the invention for counteracting the effect of induced longitudinal noise currents on the merit indicating signal;

Fig. 4 is a schematic circuit diagram illustrating primarily a signal comparison and selecting circuit in accordance with the invention, for comparing the noise or merit indicating signals from the various message signal receivers, and for connecting to a utilization circuit the receiver output that is associated with the most desirable noise indicating signal;

Fig. 5 is an explanatory graph to which reference is made in the circuit description; and Fig. 6 shows how Figs. 2, 3 and 4 may be arranged to disclose the complete circuit of one branch of a selecting system which is arranged in accordance with the invention.

*General description*

The invention will now be generally described as being incorporated in a system for selecting the most desirable one of four trains of the same message signal waves. It will be understood that, although the invention is described as being incorporated in a system for selecting the output of one of four message receivers, this number does not constitute a limitation on the invention, since systems embodying the invention may involve as few as two or be expanded to choose from among any reasonable number of such message receivers. Referring to Fig. 1, the same message signal waves are received on the geographically separated antennas 10, 10', 10'', and 10'''. Each of these antennas is connected to a radio receiver 12, 12', 12'', and 12''', respectively, which receivers are substantially alike and may be adapted for the reception of either amplitude-modulated, phase-modulated, or frequency-modulated signal waves. Each receiver is preferably arranged such that the volume of its audio frequency output signal is substantially independent of the level of its received radio frequency signal waves, if the energy level of these waves exceeds a predetermined minimum value; but is determined principally by the intensity of the modulating signal, or level of modulation at the transmitter. Under these circumstances, the level of the audio frequency message signal waves is substantially the same in the output circuit of each receiver 12, 12', 12'', or 12''' at any instant, if the received radio frequency signals exceed this minimum level. Noise interference energy that may be received by any one of the antennas 10, 10', etc. will be added to or included in the received message signal waves, and such interference energy will be more prominent in the receiver output product as its ratio to the audio frequency message signal energy in the receiver output is increased. The audio frequency output of each receiver 12, 12', etc. is divided, and one portion of this energy from each receiver is transmitted over connections 14, 14', etc. to a control terminal or selecting point, where it may be connected by a receiver selector 16 to a utilization circuit 18. The second portion of this output energy is supplied to a respective noise detector 20, 20', etc. which is preferably situated at the same location as its radio receiver 12, 12', etc. Noise detector 20 operates on this portion of the output energy to extract from it only the noise energies that exist in the frequency spectrum immediately above and below, but not within, the message signal band. It has been determined that, in general, the amount of noise in the voice frequency band of interest is closely related to the amount of noise which occurs above and below that band. A measure of these latter quantities is therefore an indirect but satisfactory measure of noise in the message signal band of interest. This extracted energy is then weighted in a manner which will presently be described before it is used to derive a unidirectional signal, the amplitude of which is indicative of the weighted amount of noise encountered in the previously mentioned portions of the frequency spectrum. The amplitude of this unidirectional signal is related to the amount of extracted noise energy, and in this described embodiment, it varies in inverse relation to the amount of this noise energy. It should be appreciated that this inverse relation between the amount of extracted noise and the amplitude of the derived signal need not necessarily be followed, and it should not be construed to be a limitation upon the invention. These unidirectional merit indicating voltage signals from the noise detectors 20, 20', etc. are transmitted to the control terminal, or selection point, over connections 22, 22', etc. For general descriptive purposes, these connections 22, 22', etc. are shown as being separate from connections 14, 14', etc. However, as will be later described in connection with Fig. 2, the paired connections 14, 22 or 14', 22', etc. may actually consist of a conductor pair.

The control terminal, or selection point, will generally be, but need not necessarily be, geographically separated from the location of receivers 12 and noise detectors 20. The unidirectional merit indicating signal from each noise detector 20 is received by a respective longitudinal balancing unit 24, 24', etc. at the control terminal. In this unit, the signal is converted from a balanced-to-ground signal to a single-ended or unbalanced signal, and any longitudinal noise currents which may have been added to it in the connecting path 22 are effectively eliminated. The signal output of each longitudinal balancing unit 24, 24', etc. consists of a unidirectional voltage, which has at any instant an amplitude that is representative of the weighted amount of noise energy that accompanies the audio frequency message signal energy in the output circuit of a respective receiver. Since, as was previously stated, the message signal energy in the output of each receiver is at any instant at the same level, it follows that a comparison of the noise energy indications, or merit indicating signals, for the receivers is in effect a comparison of the signal-to-noise ratio of the respective receivers. This comparative function is performed in receiver selector 16 at the control terminal. For general descriptive purposes, this unit is functionally indicated in Fig. 1 as a mechanical switch arrangement comprising the main contactor 26 and switches 28, 28', 28'', etc. In addition, a threshold circuit 30 and threshold switch 32 are functionally shown as entities separate from the receiver selector 16. Actually, as will be noted in connection with the description of Fig. 4, these latter units may form a portion of the receiver selector 16. Selector 16 is arranged such that it responds to the merit indicating unidirectional voltage of greatest amplitude as received from the various longitudinal balancing units [illegible], [illegible]', etc. to actuate its contactor [illegible] and close the circuit of only one switch [illegible], [illegible]', etc. at any instant. The closure of a switch [illegible], [illegible]', etc. connects to the output circuit [illegible] the audio signal output of the radio receiver that produces the unidirectional merit indicating signal of greatest amplitude. Concurrently with this action, the merit indicating signal from each balancing unit [illegible], [illegible]', etc. is supplied to the threshold circuit [illegible], in which it is determined whether any one of the signals exceeds a predetermined minimum value that has been chosen as being representative of "just usable" or minimum quality received signals. If any one of the merit indicating signals exceeds this minimum value, it is indicative that some one of the receivers [illegible] is producing in its output circuit, the desired message signals at a level which, with respect to any accompanying noise currents or signals, has been previously adjudged to be suitable for service purposes. Under these conditions, the normally non-operated threshold switch [illegible] is closed, and output circuit [illegible] is connected to utilization circuit [illegible]. Utilization circuit [illegible] may be any suitable terminating circuit such as a subscriber's subset, a connecting circuit such as a trunk circuit, or a switchboard termination. If none of the merit indicating signals exceeds this minimum, or "just-usable" value, the threshold switch [illegible] remains non-operated; notwithstanding that receiver selector [illegible] may have actuated its contactor [illegible] to select the best one of the subnormal indicating signals which it received from balancing units [illegible], [illegible]', etc., and, in so doing, has connected the signal output circuit of the appropriate receiver to the selector output circuit [illegible].

The manner in which these described functions are performed may best be understood from a consideration of Figs. 2, 3, and 4 when arranged in the fashion shown in Fig. 6. In Figs. 2 and 3, only one noise detector [illegible] and one longitudinal balancing unit [illegible] are shown, inasmuch as it is believed that an understanding of this portion of the practice of the invention can readily be secured by a consideration of one selecting branch only. It should, of course, be appreciated that a complete selecting system would ordinarily employ as many detectors [illegible] and balancing circuits [illegible] as there are receivers [illegible] from which a selection is to be made. In Fig. 4, the details of two, the upper and lower, selecting channels only are shown, since it is believed that a thorough understanding of this portion of the invention may be secured from a consideration of the details and action of these two channels. It is to be understood that the circuit details of the intermediate selecting channels, the presence of which is diagrammatically indicated by the block representations, are substantially the same as those shown for the other channels.

*Detailed description*

Receiver [illegible] is shown at the upper left of Fig. 2. The output of this receiver is unbalanced with respect to ground, and is connected through a resistance pad or attenuator [illegible] and a transformer [illegible] to conductor pair [illegible]. The attenuator [illegible] is provided so that the impedance of the line, as seen through the transformer [illegible], will not have an appreciable effect on the audio frequency and noise voltages appearing on conductor or lead [illegible]. At this point, it may be noted that conductor pair [illegible] forms the same conductive connections that were shown separately in Fig. 1 as connections [illegible] and [illegible]. One portion of the signal output from receiver [illegible], constituting the message channel thereof, is transmitted over conductor pair [illegible] to the receiver selector unit [illegible] (Fig. 4). A second portion of the output from this receiver, constituting the merit indicating signal channel thereof, is transmitted to noise detector [illegible] over conductor [illegible] to a frequency sensitive network comprising resistors [illegible], [illegible], [illegible] and capacitor [illegible]. This network discriminates in favor of the higher frequency noise energy, and aids in evaluating the interfering effect of unwanted interfering periodic radiations which may be modulated by low frequency components. One portion of the output from this network is connected over conductor [illegible] to a band-pass filter [illegible], the values of the circuit elements of which are so chosen that it rejects all frequencies within the band of message signal frequencies, and passes only frequency components both above and below this signal band. It is a purpose of this filter to eliminate, in so far as it is practicable, the message signal frequencies that are supplied over conductor [illegible]. In a tested embodiment of the invention, this filter was designed to reject frequencies in the band between 200 and 7000 cycles per second and to pass or transmit frequencies outside of that band. Noise or interference frequency currents that are passed by filter [illegible] are connected through transformer [illegible] to the input of a variable loss circuit, which comprises transformers [illegible], [illegible], unidirectional conducting devices [illegible], [illegible], and capacitors [illegible], [illegible]. Devices [illegible], [illegible] may be constructed of any of several suitable materials, and each has the characteristic that it conducts current in one direction with considerably greater facility than it does in the opposite direction, and also that its resistance in its conductive direction is controlled to a marked extent by the magnitude of the potential existing across the unit. Devices having these general properties are often termed "varistors," and will be so designated in this description. In a tested embodiment of the invention, these devices [illegible], [illegible] were dry-disc copper oxide type of varistors. Capacitors [illegible], [illegible] act to neutralize the capacities that are inherent in this type of varistor, and together with these inherent capacities form a balanced capacitive bridge arrangement. The values of capacitors [illegible], [illegible] will, of course, depend upon the inherent capacitance of the actual varistors that may be used. Conductors [illegible], [illegible] are connected to the mid-points of the windings of transformers [illegible], [illegible] and serve to impress across the varistors [illegible], [illegible], a varying potential which is derived in a manner which will now be described.

Capacitors [illegible], [illegible], [illegible] and inductor [illegible] comprise a bandpass filter which has minimum attenuation at a frequency corresponding to the middle of the messsage signal band. The attenuation of this filter at frequencies outside the band of message signal frequencies is relatively high. The message signal frequencies are passed through a transformer [illegible] to a full wave rectifier [illegible] to develop across potentiometer [illegible] and filter capacitor [illegible] a unidirectional voltage which is indicative of the presence of and the strength of message signal frequencies in the output of the radio receiver. The polarity of this rectified voltage is opposite to the polarity of the voltage that is developed across potentiometer [illegible] by the anode-cathode current of the electron discharge device, specifically a pentode, [illegible], which also flows through this potentiometer. Conductor [illegible], [illegible] are connected across potentiometer 84 in such fashion that they apply to the varistors 52, 56 a potential which is the algebraic sum of the potentials developed across potentiometer 84 as described. It might be stated at this point that this last described circuit branch, comprising the full wave rectifier 98, is provided in order to desensitize the noise detector 28 during periods when the level of the message signals at the transmitting station are exceedingly high. The reason for this will be developed in connection with the description of the operation of the circuit. Thus, the transmission loss through the variable loss circuit is controlled by the potential that is applied over conductors 62, 64 to the varistors 52, 56 in this circuit.

The secondary winding of transformer 50 is terminated by potentiometer 59. The control grid of an electron discharge device, specifically, a pentode, 61 is connected to the movable arm of potentiometer 59, and this device comprises the first stage of a two-stage amplifier which includes the pentodes 61, 66. This amplifier may be in accordance with conventional design. Its circuit constants are so chosen that it has a substantially uniform amplification characteristic over a range which includes any desired frequencies above and below the message signal frequencies. The output of this amplifier is connected through a transformer 68 to a full wave rectifier circuit comprising a double diode 72, terminating resistors 70, 71 and load resistor 75. The output of this rectifier is passed through an energy storage and filter arrangement comprising load resistor 75, a capacitor 74, and the resistor-capacitor combination 76, 77. The time constants of the rectifier and storage circuits are chosen such that a finite time is required for the energy contained in sudden sharp bursts of noise to develop full potential across capacitor 74. In one tested embodiment, a suitable time constant for this circuit was found to be about 100 microseconds. After a potential has been developed across capacity 74 by a surge of energy, this condenser will discharge partly through resistor 75 and partly through the resistor-capacitor combination 76, 77. This latter combination forms a filter circuit which prevents undesirably sudden changes of potential from accumulating across capacitor 77. The discharge time constant of capacitor 74 is preferably relatively long with respect to its charging time constant, and in one tested embodiment of the invention a discharge time of about 10 milliseconds was found to be satisfactory. The successful practice of the invention is, of course, not limited to the use of the above-mentioned time constants. Any other suitable time constants may be used with equal facility. In general, it is believed that the relationship of the charging and discharging rates should be correlated with limiting factors in other portions of the communication system; for example, such factors as the cut-off characteristics of the signal channel, and the response of, or appreciation period, of a limiting unit in the utilization process. In an aural communication system, wherein the highest frequency of the message signal is restricted to some definite value, and in which some element, such as the ear, has a fairly definite minimum appreciation period; it might be desirable to restrict the charging period to a value suitably less than one-half the cyclic period of the highest usable signal frequency, and to arrange the discharge period at a value suitably less than the minimum appreciation period of the ear. Such an arrangement imparts to the detected interference components a weighting factor that is variable with frequency, and, which causes the control effect of these detected components to vary in a manner that is similar to that in which the impairment effect of noise components is observed to vary in the utilization circuit. At the same time, the response of the detection device is fast enough to permit the proper evaluation, or appreciation, of undesirable quantities of interference energy in a shorter period than is required by the limiting receptive member for a similar appraisal. The control electrode of pentode 80 is connected to the common point of resistor-capacitor combination 76, 77. The cathode circuit of pentode 80 includes an adjustable resistor 82 and the potentiometer 84, across which are connected conductors 62, 64. Anode power supply for pentode 80 is secured from the respective longitudinal balancing circuit 24 (Fig. 3) at the control terminal point or site. This potential is transmitted to the location of noise detector 28 over the upper conductor of conductor pair 33. The lower conductor of conductor pair 33 forms the return path for this circuit and is connected to the anode-cathode circuit of pentode 80 at the lower end of cathode load potentiometer 84. Capacitor 86 joins the upper and lower sections of the secondary winding of transformer 31 to form a conductive path for the voice frequency signal currents from receiver 12, and to block the direct current that is flowing in the upper and lower conductors of pair 33.

A similar blocking function is performed by capacitor 101 at the longitudinal balancing unit end of conductor pair 33, as is shown in Fig. 3. Transformer 100 is inserted in the circuit of conductor pair 33, and, together with capacitor 101, forms a blocking circuit for the direct current derived from potential source 120 through resistor 102. The anode-cathode circuit of pentode 80 (Fig. 2) includes potential source 120, load resistor 102, the upper conductor of conductor pair 33, resistors 82, 84, the lower conductor of conductor pair 33, resistor 103, a portion of voltage dividing potentiometer 104 to the grounded terminal of source 120.

Voltage dividing potentiometer 104 provides a convenient and ready means of adjusting the potential of the cathode of pentode 80. This potentiometer provides a means for imparting a small fixed adjustment to the unidirectional signal voltage as it is obtained from the noise detector 28, and permits the proper coordination of these voltages from the various noise detector units of a selecting system. Resistors 102 and 103 may be approximately equal and of any suitable value consistent with the length of conductor pair 33 and the characteristics of pentode 80.

With respect now to the longitudinal currents balancing circuit or unit 24, anode potential for balancing electron discharge device or pentode 109 is supplied from potential source 120 through anode load resistor 105. Resistors 106, 108, potentiometer 107 and anode load resistor 105 form a voltage dividing circuit. The movable arm of potentiometer 107 is connected through a coupling capacitor 115 to the control electrode of pentode 109. Values for these components and the the dynamic characteristic of pentode 109 are coordinated such that, the amount of voltage change that is applied to the control grid of pentode [illegible] is just sufficient to counteract in its anode circuit the voltage change that occurs at the junction of resistors [illegible], [illegible]. For example, if the potential at the junction of these latter resistors changes by one volt in a positive direction, the potential at the anode of pentode [illegible] will change by an equal amount in the opposite direction. Because of the large amount of voltage feedback present in the anode-control grid coupling circuit, the transmission equivalent between the junction of resistors [illegible], [illegible] and the anode of pentode [illegible] is determined primarily by the voltage dividing circuit comprising resistors [illegible], [illegible] and [illegible], and is relatively independent of changes in the other parts of the circuit. Resistors [illegible], [illegible], [illegible] form a voltage dividing network for the proper biasing of the control electrode of pentode [illegible]. The anode circuit of pentode [illegible] is connected through coupling capacitor [illegible] to two voltage dividing circuits, one of which includes equal valued resistors [illegible] and [illegible], the other of which includes equal valued resistors [illegible], [illegible]. The value of these resistors may, but need not be, the same so long as the paired resistors are equal valued. Conductors [illegible] and [illegible] are connected at one end of each to the junctions of resistors [illegible], [illegible] and [illegible], [illegible] respectively. The other ends of these conductors are connected to the input circuits of the selecting and threshold branches, respectively, of receiver selector [illegible] (Fig. 4).

The noise-indicating signal on conductor [illegible] is supplied to the input of the channel selection branch of selector [illegible] (Fig. 4) which branch includes an electron discharge device, specifically, a triode [illegible]. Resistors [illegible] or [illegible] and capacitor [illegible] constitute an integrating network for adding a predetermined delay to the voltage changes that are supplied to the control electrode of the triode [illegible]. Whether resistor [illegible] or resistor [illegible] forms a component of this integrating network depends upon whether relay [illegible] is operated. Resistor [illegible] is smaller than resistor [illegible] by any desirable amount in order to provide a faster selection by triode [illegible] at the beginning of a transmission interval.

In its non-conduction state, the anode-cathode circuit of triode [illegible] includes source [illegible] of anode potential, conductor [illegible], the winding of relay [illegible], the space-discharge path of triode [illegible], conductor [illegible], contact [illegible] of relay [illegible], conductor [illegible], cathode-biasing resistor [illegible] and a source [illegible] of negative potential, the positive terminal of which is connected through a common ground connection to the negative terminal of source [illegible]. A source [illegible] of negative potential is connected over conductor [illegible] to the winding of relay [illegible], and meets operating ground over the contact of relay [illegible] when this latter relay is operated. Resistors [illegible], [illegible] are connected over conductors [illegible], [illegible] to form a voltage divider across a biasing source [illegible] and its filter capacitor [illegible]. The cathode of triode [illegible] is connected to the junction of these resistors. When relay [illegible] is operated, in a manner which will be presently described, the message signal conductor pair [illegible] is connected over contacts [illegible] and [illegible] of this relay and conductor pair [illegible] to contacts [illegible] and [illegible] of relay [illegible] in the threshold branch of the circuit. Operation of this latter relay connects the signal output of the selected receiver [illegible] (Fig. 2) to the utilization circuit [illegible]. The operation of relay [illegible] also supplies ground over contact [illegible] and lead [illegible] to a signal lamp in the terminating switchboard of utilization circuit [illegible], when provided, to indicate that some one of the receivers [illegible] is producing a message signal of usable quality.

The unidirectional voltage signal from each longitudinal balancing unit [illegible] is supplied over the respective conductor [illegible], [illegible]′, etc. to a unidirectional device [illegible], [illegible]′, etc., in the threshold branch of the circuit. The cathodes of these devices are connected in parallel and their circuit includes load resistors [illegible], [illegible] and a portion of potentiometers [illegible]. The control electrode of an electron discharge device or triode [illegible] is connected to the common point of resistors [illegible], [illegible]. The lower end of resistor [illegible] is connected to the movable contact of potentiometer [illegible], which forms a voltage divider across the source [illegible] of negative potential. The anode-cathode circuit of triode [illegible] includes the source [illegible] of positive potential, the winding of a relay [illegible], the space discharge path of triode [illegible] and a ground connection which is common to the source [illegible]. The operation of relay [illegible] connects operating ground over its contact to one terminal of the winding of relay [illegible], the other terminal of which is connected to the source [illegible] of negative potential.

It will be noted from Fig. 4 of the drawing that, in this described embodiment of the invention, selector [illegible] comprises four parallel selecting branches, or channels. The circuit details of each of these channels are substantially identical with those of the first, or upper, channel which have been described. Like circuit elements have been assigned the same reference numeral in each channel, and either a single, a double, or a triple prime exponent has been added to the numeral to properly identify the element in its branch, or channel location. Most of the circuit details of the intermediate branches, or channels, of selector [illegible] have been omitted in the interest of simplicity, and the presence of these branches is indicated by the block diagrammatic representations.

*Description of operation*

The operation of the selecting system of this invention, the structure or circuit arrangement of which has just been described, can best be understood from the following description of the operation of the arrangement shown in Figs. 2, 3 and 4. Assume first that no receiver of the system, as exemplified by receiver [illegible] (Fig. 2), is receiving a usable train of message signal waves. Under these circumstances, the noise energy in the output circuit of receiver [illegible] will ordinarily be at a relatively high level. In a manner which will be presently explained, the bias voltage on the control electrode of pentode [illegible] in noise detector [illegible] will be at a relatively high negative value, and the current flowing in its anode-cathode path and in conductor pair [illegible] will be low. The voltage drop across resistor [illegible] (Fig. 3) will be small, and the potential that is supplied to conductors [illegible], [illegible] by the potentiometer circuits comprising resistors [illegible], [illegible], [illegible], [illegible] will be low. The actual value of this potential on conductor [illegible] may or may not be sufficient to cause triode [illegible] to conduct, and in so doing to operate its anode load relay [illegible]. If relay [illegible] is operated, it completes the ground connection for operation of relay [illegible], thereby connecting the signal output of receiver [illegible], on conductor pair [illegible], over contacts [illegible], [illegible] of relay [illegible], to interconnecting pair [illegible], the circuit of which is open at contacts [illegible] and [illegible] of relay [illegible]. The potential supplied over conductor [illegible] to diode [illegible] in the threshold branch of selector [illegible] will be low, and the voltage that is developed across voltage divider 188, 190 will also be low. The portion of this potential that is supplied to the control grid of triode 164 will be insufficient to overcome the negative bias that is derived by its control electrode from potentiometer 182. Under these circumstances, triode 164 will not conduct current, its anode load relay 166 will not be operated, threshold relay 108 will not be connected to ground from the contact of relay 166 and will remain unoperated, and the circuit from conductor pair 142 to the utilization circuit 18 will be broken or open at contacts 5 and 6 of relay 108. Therefore, notwithstanding that the upper selecting branch of selector 16 may have functioned to connect the signal output of receiver 12 to interconnecting pair 142, the output of this receiver is not connected to utilization circuit 18 because the threshold circuit has adjudged the received noise signal to be representative of output signals that are less than the "just usable," or minimum, commercial grade. This "just-usable" or minimum value signal is a predetermined quantity, and may be changed by varying the position of the movable arm of potentiometer 182. Now assume that a usable grade of audio message signal exists in the output of receiver 12. Because the level of energy in the output circuit of the receiver is controlled by the level of modulation at the transmitter, the noise energy in the output circuit of the receiver will be reduced from its former high value by some unspecified amount. This revised output energy is treated in the same manner as was the previous noise energy. A portion of it is transmitted through attenuator 29 and transformer 31 to conductor pair 33, and over this conductor pair to contacts 2 and 3 of relay 142 in receiver selector 16. Assume for purposes of this explanation that, at this time, this relay is unoperated and contacts 2 and 3 are open. A second portion of the signal output from receiver 12 is supplied over conductor 36 to the frequency sensitive network comprising capacitor 38 and resistor 40 and voltage dividing resistors 42, 44. The transmission loss through this network varies inversely with frequency. The network has two output circuits, one of which is connected to the band-pass filter comprising inductor 90 and capacitors 91, 92. The message-signal output from this filter is supplied through transformer 94 to full-wave rectifier 96. The rectified output voltage is applied over conductors 62, 64 to the variable loss circuit comprising varistors 52, 50, and tends to control the loss through this circuit by controlling the impedances of the varistors. The second output from the frequency sensitive network 38, 40 is applied over conductor 46 to the input of band-reject filter 48, the characteristics of which are such that it passes frequencies both above and below, but not within the band of message signal frequencies. Because of the frequency discriminating action of network 38, 40, the higher frequency noise components are transmitted to band-reject filter 48 with greater facility than are the low frequency components. As was previously stated this arrangement is helpful in evaluating the interfering effect of unwanted radiations which may be modulated by low frequency components. The noise energy that is passed by filter 48 is transmitted through the variable loss circuit comprising transformers 50, 60 and varistors 52, 58 to the amplifier comprising devices 61, 66. This amplified noise energy is rectified in the full-wave rectifier circuit comprising the double diode 72, balancing resistors 70, 71 and load resistor 75, together with its filter which includes capacitors 76, 77 and resistor 78. Because of the limiting action in receiver 12, less noise energy will now be rectified than was previously the case, and the potential across capacitor 77 will be reduced. The negative potential at the control grid electrode of pentode 80 will now be less than in our previously assumed case, where no message signal was being received. The anode-cathode current in this pentode will now be increased, and will provide a greater voltage across potentiometer 84 than heretofore existed. The potentials that are generated across this potentiometer by the passage through it of cathode current from pentode 80 and the rectified current from rectifier 85 are opposed in polarity. The net potential is supplied over conductors 62, 64 to the previously-mentioned variable loss circuit comprising varistors 52, 58 where it controls the transmission loss through this circuit by affecting the characteristic of these varistors.

The action of this feedback arrangement is to linearize the relationship between the current flowing in the anode-cathode circuit of pentode 80, with respect to logarithmic variations in the level of the noise input to detector 28. This action comes about because the magnitude of the anode-cathode current of pentode 80 is an inverse function of the level of the rectified noise energy. As the noise level is decreased, the cathode current of pentode 80 and the potential across potentiometer 84 are increased. This increased voltage is fed back over conductors 62, 64 to the variable loss circuit where it decreases the transmission loss by controlling the characteristics of varistors 52, 56. This action tends to increase the rectified noise energy, and thereby reduce the cathode current of pentode 80, and the potential across potentiometer 84. The net effect of this arrangement is to produce a stabilized system having the desired characteristic, such as is shown by the idealized curve 172 of Fig. 5. Curve 172 shows the manner in which the anode-cathode current in pentode 80 may be changed by logarithmic variations in the level of the noise energy that is applied to the input of detector 28 when sufficient voltage is fed back to control varistors 52, 56 possessing suitable current-voltage characteristics. If no feedback arrangement, or its equivalent, were used the input-output characteristic of detector 28 would be similar to that shown by curve 174 of this figure. It will be noted that this latter curve varies considerably from the more desirable logarithmic characteristic and that its operation is restricted to a relatively small range of input levels. The departure may be great enough that signals having a suitable or acceptable noise ratio would be rejected. From the described action of detector 28, it will be appreciated that this unit produces in its anode-cathode circuit, and, therefore, in the direct current circuit which includes conductor pair 33, a current the magnitude of which increases linearly as the logarithmic relation between the signal and noise in the output of receiver 12 is increased. Therefore, for low noise values this current will be at its maximum values. Potentiometer 84 is made adjustable to permit control of the amount of this fed back voltage so that essentially the same input-output characteristic may be obtained from each noise detector 28 in the selecting system.

Because non-linearity generally exists in the transmission path between the input to a radio transmitter and the signal output of its associated receiver, there results a distortion product or products whenever a message signal is transmitted. This distortion product may not be appreciable under ordinary circumstances, but it becomes more prominent as the input signal attains an extraordinary high level. This corresponds to a high level of modulation, which produces a loud or high level output signal. Many of these distortion products fall in the frequency range above and below the signal frequency band, and are thus passed by the band-reject filter 41. Since they are passed by this filter, the detector circuit 30 would normally treat them as indications of objectionable noise conditions, if it were not for the operation of that portion of the circuit that comprises full-wave rectifier 97. This portion of the circuit receives some of the audio signal energy from the frequency sensitive network 46, 48 and produces from it a unidirectional voltage, the magnitude of which is indicative of the level of the message signal, and the polarity of which is opposite to the polarity of the voltage generated across cathode potentiometer 86 by the flow of cathode current in pentode 86. Being thus poled, this rectified voltage acts on varistors 47, 50 during period of high message signals to increase the transmission loss through these units, and thus to momentarily incapacitate noise detector 30. Through this action, the noise detector 30 is prevented from mistaking distortion products, which arise from otherwise desirable message signals, as objectionable interfering noise currents.

It will be noted that detector 30 is isolated from direct ground connection, and that the anode power supply for pentode 86 is derived over the line 38 from the associated longitudinal balancing unit 34 (Fig. 3) which may be, and probably will be located at a considerable distance from detector 30. None of the circuit elements associated with the line and pentode 86 have any direct current connection to the ground at the receiver location, the potential of all points in that part of the circuit being determined with respect to the ground potential at the control terminal. This prevents a difference in ground potential between any receiver station and the control terminal from altering and thus falsifying the indication signal.

The anode-cathode current of pentode 86, the magnitude of which is indicative of the ratio of the signal and noise in the output circuit of receiver 12, flows through conductor pair 38 and, therefore, is subject to any induced interfering voltages. Since this circuit is isolated from ground potential, these interfering voltages will be induced in equal amounts of the same polarity in each of the conductors of the pair.

The action of the longitudinal balancing unit 34 is such that the effect of these induced voltages is eliminated. Positive potential is supplied from source 100, through anode load resistor 102, over one conductor of pair 38, to the anode of pentode 86 in dectector 30 (Fig. 2). This tube's cathode current flows through potentiometer 88, one conductor of pair 38, through resistor 103 and biasing resistor 104 to ground. Therefore, as the anode-cathode current through pentode 86 (Fig. 2) increases, the potential with respect to ground at the lower end of resistor 102 is decreased and at the upper end of cathode resistor 103 is increased. These resistors are substantially equal in value and, therefore, these changes in potential are equal and opposite. A portion of the potential change across anode resistor 102 is applied through the movable contact arm of potentiometer 107 and coupling capacitor 113 to the control electrode of pentode 109. This voltage produces in the anode circuit of pentode 109 a voltage change which is equal in amplitude and opposite in polarity to the change across resistor 103. This equal and opposite change is coupled through coupling capacitor 110 to the parallel voltage dividing circuits comprising resistors 111, 112 and 113, 114. Since the voltage at each end of the dividers is changed by the same amount, the potential of conductors 124, 126 with respect to ground is changed by an equal amount. If, however, interference voltages of the longitudinal type are induced on conducting pair 38, there will appear at the lower and upper terminals of resistors 102, 103, respectively, potential changes which are equal and of the same polarity. Under these circumstances, when a portion of the change that appears at the lower terminal of resistor 102 is applied through the movable contact of potentiometer 107 and coupling capacitor 113 to the control electrode of pentode 109, there appears in the anode circuit of this pentode a potential change which is equal in value but opposite in polarity to the potential change at the upper end of resistor 103. Since equal but opposed changes are made at the two ends of the voltage dividers, the potential on connecting circuits 124, 126 remains unchanged, and the interfering effect of the induced longitudinal voltage is eliminated.

The voltage on conductor 126 controls the operation of the threshold branch of selector 16 (Fig. 4) while that supplied over conductor 122 controls the operation of the receiver switching or selecting branch of the selector unit. In the following explanation of the operation of receiver selector 16 it will be understood that, although only one longitudinal balancing unit 34 (Fig. 3) is shown as providing unidirectional voltage signals to conductors 122, 124 of selector 16, similar signals are supplied over conductors 122', 124' etc. to the remaining switching, or selecting, and threshold branches of this circuit. These voltage signals are obtained from the noise detectors 30', 30'', 30''' and longitudinal balancing units 34', 34'', 34''' that are associated with the other receivers of the communication system. It will also be understood that the details of these circuits, although they are not shown on Figs. 2 and 3, are to be taken to be substantially the same as the details there shown for that one selection branch. The voltage on conductors 122, 124 is, as was stated, a single-ended signal, the magnitude of which varies inversely as the level of the noise energy varies in the output of the respective receiver. In our assumed example, the signal in the output circuit of receiver 12 is changed from one which consisted almost entirely of noise energy to one in which the message signal energy is dominant, and a relatively small amount of noise energy is included. The voltage signal on conductors 122, 124 is accordingly changed from a low voltage value to a relatively high voltage value. As the voltage on conductor 124 is increased, the negative bias on the control electrode of threshold tube 164 is counteracted by the potential developed across the rectifier load comprising resistors 158, 160, and the potential of this electrode is raised to a value where the resulting anode current flow is sufficient to operate relay 166. This condition corresponds to the reception of a usable or commercial grade of signal by receiver 12. It will be readily seen that this same action would occur if this commercially usable signal had been received by any one of the other receivers 12', 12'' or 12'''. Relay 168 connects ground over its contact, through the winding of threshold relay 108, to potential source 176 and causes this latter relay to operate, which action opens contacts 1, 2, 3 and 4 and closes the contacts 5 and 6 of this relay. The closure of contacts 5 and 6 connects the output of a selected receiver, in this assumed case receiver 12, to the utilization circuit 18.

The manner in which receiver 12 is selected and the remainder of the receivers are rejected by the selection branch of selector 16 will now be explained. It was assumed that the anode current flowing in triode 134 was insufficient to hold its anode load relay 138 in the operated condition. When the voltage signal on conductor 122 changes from a relatively low value to a relatively high value, which value is in excess of any voltage signal that exists on incoming conductors 122', 122'', 122''', triode 134 is caused to increase its anode-cathode current to a value that is sufficient to operate relay 138. Relay 138 connects ground over its contact to the winding of relay 142. The operation of relay 142 opens the short-circuiting connection across resistor 152, provided by normally closed contact 1 of relay 142, and closes over its contacts 2 and 3 the connection from conductor pair 33 to interconnecting pair 143. Since pair 143 is closed through contacts 5 and 6 of relay 108 to the utilization circuit 18, the output of receiver 12 is connected to this latter circuit.

It will be noted that resistor 146 is included in the cathode circuit of each triode 134, 134', etc. The voltage that is developed across this resistor by the combined current flow in all triodes 134, 134', etc. exerts a degenerative feed-back effect which tends to bias the cathode of each tube positive with respect to the potential of its control electrode. Therefore, if the same potential exists on each control grid electrode, the cathode of each triode will be at the same potential, however, if the potential of the control electrode of one triode exceeds that of the control electrode of any other triode, the current flow through the triode having the highest potential on its control electrode will establish the potential at all of the cathode electrodes. Therefore, as the current flow in triode 134 increases because of the increased potential on its control electrode, its cathode current flowing through the common load resistor 146 increases the potential of its own cathode electrode and that of all other connected cathode electrodes. If the potential increase is sufficiently large the entire anode-cathode current flow will be transferred to triode 134, and the remainder of the triodes 134', 134'', etc. will cease conduction. This condition will continue until some one of the longitudinal balancing units 24', 24'' etc. supplies to its associated selection branch of selector 16 a potential which is substantially equal to that existing on the control grid electrode of triode 134 in the upper branch. If such a condition prevailed, receiver selector 16 might connect the output of two receivers, for example, receiver 12 and 12' to the utilization circuit 18, or it might be subjected to undesirable indecision by switching from the output of one to that of another of the receivers as the noise energy in the output circuits of these receivers fluctuates one above the other by a slight amount. To prevent these conditions, a preferential biasing arrangement is provided such that when a usable signal has been chosen by selector 16, it will continue to be chosen until it is supplanted by a more desirable signal which exceeds the chosen signal by a predetermined amount. This preferential biasing feature is brought into action when relay 142 opens the circuit which was formerly closed over its contact 1. This action removes the short-circuit connection which formerly existed across resistor 152, and produces across the combined resistors 150, 152 a voltage drop which is equal to the potential of source 154. The effect of this action is to lower the potential of the cathode electrode of triode 134 with respect to the potential of the remaining cathode electrodes by a predetermined amount which is controlled by the relative values of resistor 150, 152 and the potential of source 154. Under these circumstances then, before any other branch of selector 16 can connect the output of its associated receiver to utilization circuit 18, and in so doing bias triode 134 of the upper branch to its non-conduction state, the potential on the control grid electrode of its associated discharge device must exceed the potential on the control grid electrode of triode 134 by at least the amount of the voltage drop across resistor 152.

Each electron discharge device or vacuum tube 134, 134', etc., of the selector tube array is preferably chosen for a high transconductance wherein a relatively small change in grid-cathode potential difference will produce a relatively large change in anode-cathode circuit current. As already referred to hereinabove, the circuits associated with the electrodes of these tubes include feedback by virtue of the common cathode resistor 146, to establish an anode-cathode current in that one of the tube array whose control grid has received the highest-valued input signal, that is, input signal respective the best merit-indicating signal. This anode-cathode current remains substantially constant even though the potential applied to the control grid of such one tube varies or changes over a range corresponding to a wide variation of input; assuming, of course, that the range of variation of the potential applied to the control grids of the other tubes during such period is at all times less than the then applied potential on the control grid of the one tube, taking into consideration, also, the preferential bias provided by the resistor 152, 152', etc. However, when the control grid potential on one of the other tubes is such that current is caused to flow in the anode-cathode circuit of such second tube, then a small variation in the potential of either such one tube or such second tube produces large changes of current in their respective anode-cathode circuits. In a tested embodiment of such a tube array, the devices 134, 134', etc. were R. C. A. type 6SL7GT; the resistor 146 was of 100,000 ohms; resistors 150, 150', etc., and resistors 152, 152', etc., were of 1000 ohms each; the relays 138, 138', etc., were chosen and adjusted for operation on approximately .7 milliampere and for release on approximately .4 milliampere; cathode-anode circuit current through the cathode resistor 146 varied between approximately 1.5 and 1.9 milliamperes.

For descriptive purposes, let it now be assumed that there is received on conductors 122''' and 124''', a signal having an amplitude that is greater than that of the signal on conductors 122, 124 by more than the voltage drop across resistor 152. The main anode-cathode conduction path will be transferred from the upper selection branch, which includes triode 134, to the lower selection branch, which includes triode 1''', because of the degenerative bias that the increased anode-cathode current in triode 181''' imposes upon the control electrode of triode 181. Under these circumstances, triode 181 will cease conducting, relays 1[illegible] and 1[illegible] will release, and, in so doing, open the connection between conductor pairs [illegible] and 1[illegible], and restore the short circuiting connection across resistor 1[illegible]. Simultaneously with this action, relays 180''' and 1[illegible]''' will be operated to connect conductor pair 88''' to conductor pair 1[illegible], and to open the short circuiting connection around resistor 1[illegible]''' over contact [illegible] of relay 1[illegible]''', to add the preferential bias voltage across resistor 1[illegible]''' in favor of the lower selecting branch. The lower selecting branch will continue to connect the output of its associated receiver 1[illegible]''' to the utilization circuit [illegible] as long as the merit indicating signal provided by its longitudinal balancing unit 1[illegible]''' continues to exceed that supplied by any of the other associated balancing units. Since the potential that existed at the control electrode of triode 1[illegible] in the threshold branch of selector 1[illegible] was adequate to provide sufficient anode-cathode current in this triode to hold operated the anode load relay 1[illegible], the increased signal on conductor 1[illegible]''' causes no added effect.

If the voltage that is derived by the threshold circuit from conductors 1[illegible], 1[illegible]', etc. is at any time decreased to a value where the potential on the control electrode of tube 1[illegible] is insufficient to hold relay 1[illegible] operated, the connection between conductor pair 1[illegible] and utilization circuit 1[illegible] will be broken; notwithstanding that some one of the selecting branches of receiver selector 1[illegible] may be operating to connect the output of its associated receiver to conductor pair 1[illegible], and to exclude the output of all other receivers in the system. If this condition exists for an undesired interval, and it is desired to accept any one of whatever understandable or decipherable receiver outputs are actually present, appropriate adjustment at the control terminal of the potentiometer 1[illegible] will effect a shift downwardly of the operating level of the device 1[illegible], and render what would not be "acceptable" with the initial setting of the potentiometer, connectible through to the utilization circuit. Of course, if instant radio transmission conditions or the presence of extraneous industrial interference should preclude any character of usable or understandable signal being produced in the receiver output circuits, use of the system necessarily would await upon the clearing of such conditions.

The invention has been described as being incorporated in a receiver selecting system that is arranged to choose between the output signals of four receivers of the same message signal wave. It should be evident that this is only one embodiment of the invention, and that variations of this arrangement which do not depart from the spirit and scope of the invention will occur to those skilled in the art. Although the invention has been described as being incorporated in a radio communication system, it should be appreciated that it may be applied with equal facility in a variety of different types of selecting and switching arrangements in which the relative desirability of the various units or circuits is indicated by an appropriate derived or representative electrical factor, for example, a unidirectional voltage signal. Certain of the subject-matter disclosed herein is the basis of divisional applications of the present inventor, Serial No. 104,925, filed July 14, 1949, for Noise Detection Circuit, and Serial No. 241,644, filed August 11, 1951, for Radiotelephone Receiving System.

What is claimed is:

1. In a radio system comprising a plurality of radio receivers all of which are adapted to receive the same radio frequency signals and to translate said signals into audio frequency message signal outputs of substantially the same amplitudes, means for selecting from each receiver output a portion of its frequency spectrum above and below the frequencies included in said audio frequency message signals but not within the band of said audio frequency message signal, means for deriving from each such selected portion a unidirectional control voltage, said last-mentioned means comprising means for detecting the noise energy in each of said portions and for deriving from said detected energy a fluctuating unidirectional voltage and magnitude of which is indicative of the magnitude of said detected energy, a common signaling path for connection to the output circuit of only one of said receivers during any given interval, and selecting means responsive to said derived unidirectional voltages for selectively connecting to said common signaling path the output of that receiver having the smallest detected noise energy, and for maintaining said connection during the interval that such noise energy level condition maintains among said radio receivers.

2. In a communication system in which a plurality of receivers are each adapted to receive the same message signal waves and to produce in their respective output circuits audio frequency message signal waves of substantially the same instantaneous level, and in which the relative desirability of said produced message signal waves is indicated by the magnitude of a derived variable unidirectional voltage, means responsive to said derived voltages for selecting the message signal output from the receiver producing the voltage of greatest magnitude, said selecting means comprising an electron discharge device respective each receiver, said device including an anode, a cathode and a control grid electrode, a source of anode potential connected to each of said devices, switching means respective each device and responsive to current flowing from said source in the anode-cathode circuit of said device, the anode-cathode circuit of each of said devices having a common portion, and an unbypassed cathode-biasing resistor common to the anode-cathode circuit of each of said devices in said common portion of said cathode-anode circuits.

3. In a communication system in which a plurality of receivers are each adapted to receive the same message signal wave and to produce in the output circuit of each receiver message signal currents of substantially the same instantaneous level, and in which the relative desirability of said produced message signal currents is indicated by the amplitude of a derived merit indicating signal, means responsive to said derived merit indicating signal for selecting the message signal output from the receiver that produces the signal of greatest magnitude, said selecting means comprising an electron discharge device respective each receiver, each of said devices including an anode, a cathode and a control grid electrode, anode-cathode circuits and control grid-cathode circuits therefor, switching means respective each device and responsive to anode-cathode currents flowing in said device for connecting to a utilization circuit the message signal output of its respective signal receiver, an unbypassed cathode resistor common to the anode-cathode circuit of each of said devices, and means responsive to the actuation of said switching means for imparting a preferential bias to the cathode circuit of the electron discharge device connected to said switching means.

4. In a communication system in which a plurality of receivers are each adapted to receive the same message signal wave and to produce in their respective output circuits message signal currents of substantially the same instantaneous level, means respective each receiver for continuously determining the ratio of the signal and noise energies in the output circuit of said respective receiver, and means responsive to each of said derived noise indicating signals for selecting the message signal output from the signal receiver that produces the derived signal of greatest magnitude, said selecting means comprising an electron discharge device respective each receiver and including at least an anode, a cathode and a control grid electrode, anode-cathode and control grid-cathode circuits therefor, switching means respective each of said devices and responsive to current flowing in the anode-cathode circuit of said devices for connecting to a utilization circuit the output of its connected signal receiver, an unbypassed cathode bias resistor common to the anode-cathode circuit of each of said devices, and means for disconnecting from said utilization circuit the output of a selected receiver whenever the derived merit indicating signals from all of said receivers decreases below a predetermined minimum level.

5. In a communication system a plurality of receiving channels each for conveying the same speech waves and their accompanying noise wave components, a common speech wave channel for interconnection with any one of said receiving channels, means respective each of said receiving channels for deriving electric energy from the noise wave components situated only above and below the accompanying speech waves, and means responsive to said derived electric energy for interconnecting the receiving channel from which the least noise energy is so derived to said common speech wave channel to the exclusion of other receiving channels.

6. In a communication system, a plurality of receiving channels each for conveying the same band of message signal frequencies and their accompanying noise wave components, a common speech channel for interconnection with any one of said receiving channels, means individual to each of said receiving channels for continuously deriving electric energy from the noise wave components above and below but not within the band of message signal frequencies in the respective channel, means for comparing said derived energies, and connecting means for interconnecting said common speech wave channel and only that one of said receiving channels from which the least derived energy is obtained, said comparison means being adapted to control the operation of said connecting means.

7. In a communication system, a plurality of receiving channels each for conveying the same band of message signal frequencies and their accompanying noise wave components, a common speech wave channel for interconnection with any one of said receiving channels, means individual to each of said receiving channels for continuously deriving a quantitative electric representation of the noise wave components above and below but not within the band of said signal frequencies in the respective channel, the magnitude of said representation changing substantially in logarithmic relation to changes in the magnitude of said noise wave components, means for comparing said quantitative representations, and connecting means for interconnecting said common speech wave channel and only that one of said receiving channels from which the least quantitative representation is obtained, said comparison means being adapted to control the operation of said connecting means.

8. In a communication system comprising a plurality of transmission paths and for conveying the same band of audio frequency electric waves and their accompanying noise components, a common audio frequency wave channel, and means for interconnecting any one of said transmission paths and said common channel, means respective each of said paths for deriving electric wave energy from the noise wave components of frequencies in the range only above and below that of the said band of audio frequency waves, and means included in said interconnecting means and responsive to said derived energy for interconnecting with said common channel, to the exclusion of the other paths, that respective path from which the least noise energy is so derived.

9. In a communication system comprising a plurality of transmission paths each for conveying the same band of audio frequency electric waves and their accompanying noise wave components, a common audio frequency wave channel, and means for interconnecting any one of said transmission paths and said common channel, means respective each of said paths for deriving electric wave energy from the noise wave components of frequencies in the range only above and below that of the said band of audio frequency waves, means responsive to the level of the audio frequency electric waves for regulating the amplitude of the derived electric wave energy from said deriving means during a period when the audio frequency electric waves are at an unusually high level, and means included in said interconnecting means and responsive to said derived energy for interconnecting with said common channel, to the exclusion of the other paths, that respective path from which the least noise energy is so derived.

10. A communication system comprising a plurality of transmission paths each for conveying audio frequency message signals and accompanying noise wave components, means respective each path for deriving from such wave energy in the frequency range only above and below that of the message signals, a merit indicating signal, a variable characteristic of which is indicative of the variation in the relative level of the message signals and accompanying noise of the respective path, a utilization circuit for interconnection with any one of said paths, and means responsive to said characteristic of each of said derived signals for interconnecting with said utilization circuit that one of said paths having the better relative level of message signals and accompanying noise.

11. The communication system of claim 10 in which said last-mentioned means comprises a plurality of grid-controlled electron discharge devices having anode-cathode circuits, each of which includes a common load resistor for biasing substantially to cut off all of said devices except that one whose grid has impressed thereon said derived signal of the better relative level.

12. The invention of claim 11 in which the anode-cathode circuit of each of said devices includes means for applying a preferential bias to the device when the device is the non-cut-off one of said devices, whereby said non-cut-off device may in turn be cut off only by the impressing on the grid of another of said devices of a derived signal of a better relative level by a predetermined margin.

WILLIAM R. YOUNG, Jr.

References Cited in the file of this patent

UNITED STATES PATENTS

| Number | Name | Date |
| --- | --- | --- |
| 2,239,101 | Percival | Apr. 29, 1941 |
| 2,282,526 | Moore | May 12, 1942 |
| 2,321,922 | Leathers | June 15, 1943 |
| 2,343,115 | Noble | Feb. 29, 1944 |
| 2,375,051 | Taylor | May 1, 1945 |
| 2,384,456 | Davey | Sept. 11, 1945 |
| 2,414,111 | Lyons | Jan. 14, 1947 |
| 2,420,868 | Crosby | May 20, 1947 |
| 2,454,780 | Deakin | Nov. 30, 1948 |
| 2,488,193 | Hughes | Nov. 15, 1949 |
| 2,504,341 | Matthews | Apr. 18, 1950 |

FOREIGN PATENTS

| Number | Country | Date |
| --- | --- | --- |
| 117,825 | Australia | Sept. 30, 1943 |